Aug. 8, 1933.   L. B. RIVARD   1,921,263
WINDOW REGULATOR
Filed May 18, 1931   3 Sheets-Sheet 1
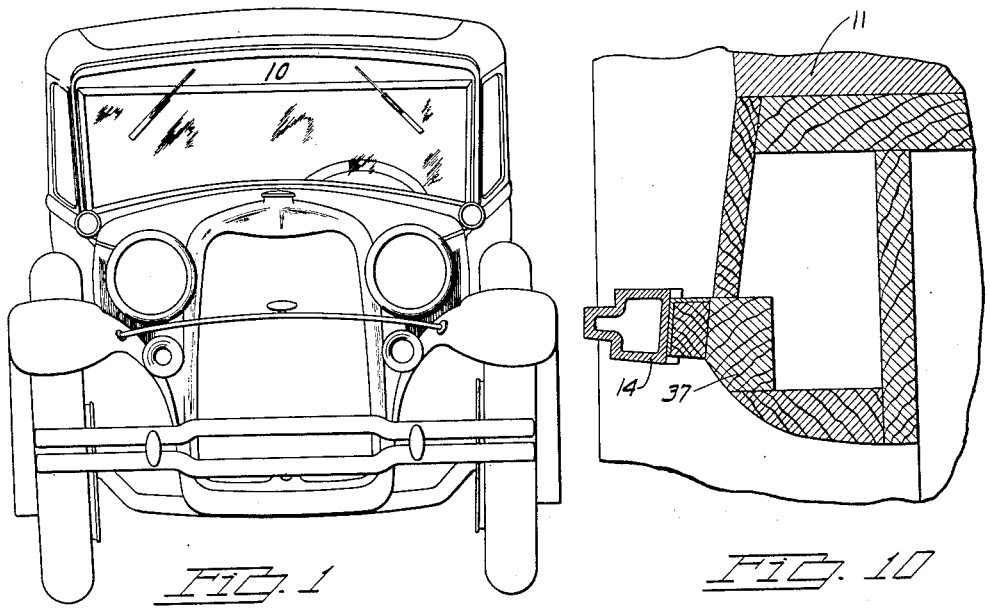
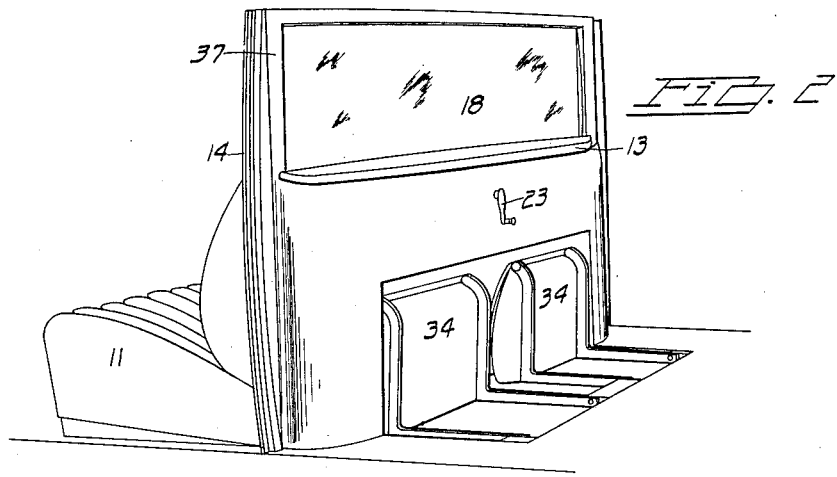
INVENTOR.
Lawrence B. Rivard
BY
Eli Davis
ATTORNEY.

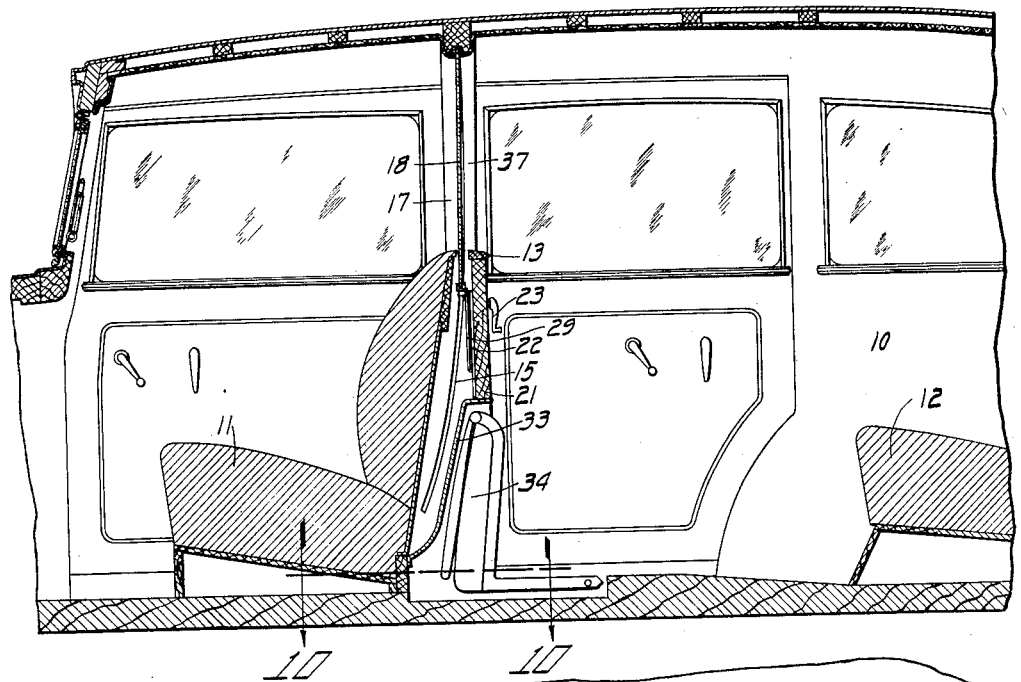
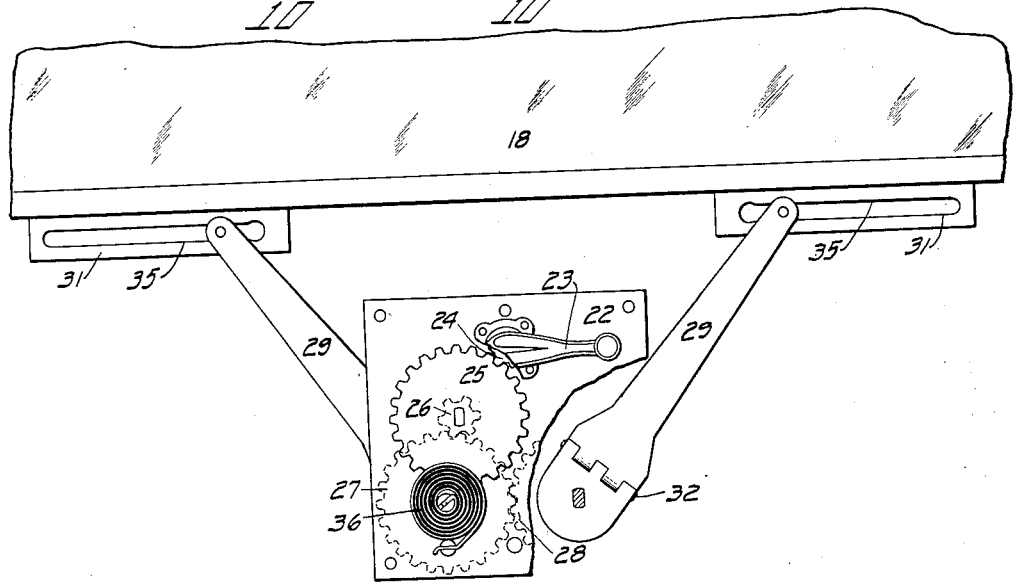

Aug. 8, 1933.   L. B. RIVARD   1,921,263
WINDOW REGULATOR
Filed May 18, 1931   3 Sheets-Sheet 3

INVENTOR.
Lawrence B. Rivard
BY
ATTORNEY.

Patented Aug. 8, 1933

1,921,263

UNITED STATES PATENT OFFICE 1,921,263

WINDOW REGULATOR

Lawrence B. Rivard, Detroit, Mich., assignor to Ford Motor Company, Dearborn, Mich., a Corporation of Delaware Application May 18, 1931. Serial No. 538,017

16 Claims. (Cl. 296—85)

The object of my invention is to provide an automobile body of the closed car type in which a glass partition separates the forward or driving compartment from the rear or passenger compartment. Such automobiles are essentially chauffeur-driven cars, the forward or chauffeur's compartment being thereby isolated from the passenger's compartment. It is the purpose of this invention to arrange this glass partition so that it may be lowered behind the front seat of the car when desired, to thereby convert the car into a sedan. The novel feature of this device is believed to reside in the arrangement whereby the lower portion of the glass partition is moved forwardly when the partition is lowered to thereby increase the foot room between the front and rear seats of the car.

It will be understood that partitions of this class have heretofore been mounted to reciprocate in a vertical path, the partition in its lowered position being housed in the back of the front seat. Because the backs of automobile seats are invariably tilted rearwardly considerable space has heretofore been lost between the lower portion of the partition and the rear edge of the seat.

In my improved construction the bottom edge of the partition, when lowered, is moved forwardly adjacent to the rear edge of the front seat to thereby make the space heretofore lost available for foot room in the car. This feature is particularly desirable in cars having auxiliary seats inasmuch as the addition of three or four more inches of foot room in front of these seats is very desirable.

My structure for accomplishing this desirable result consists of a glass frame having arcuate guides along its two sides, which guides reciprocate in arcuate runways secured to the sides of the body. Due to the arcuate movement of this partition, the ordinary type of window regulator is not suitable for use herewith, the reason being that the operating arms of such regulators invariably swing in flat planes, while an arm swinging in a curved plane is required to actuate my device. Such a novel window regulator is provided herewith and consists of an oscillating arm hinged to swing transversely to the normal plane of oscillation so that the outer end of the arm is free to follow the arcuate path described by the lower edge of the partition.

With these and other objects in view my invention consists in the arrangement, construction and combination of the various parts of my improved device, as described in the specification, claimed in my claims, and illustrated in the accompanying drawings, in which:

Figure 1 shows a front elevation of an automobile having my improved partition installed therein.

Figure 2 shows a perspective view of the front seat and partition illustrating the general arrangement of these parts.

Figure 3 shows a vertical central sectional view through the automobile body, shown in Figure 1.

Figure 4 shows a plan view of the regulator used to raise or lower my partition, part of the regulator plate being broken away to better illustrate the construction.

Figure 10 shows a sectional view taken on the line 10—10 of Figure 3.

Figure 5:
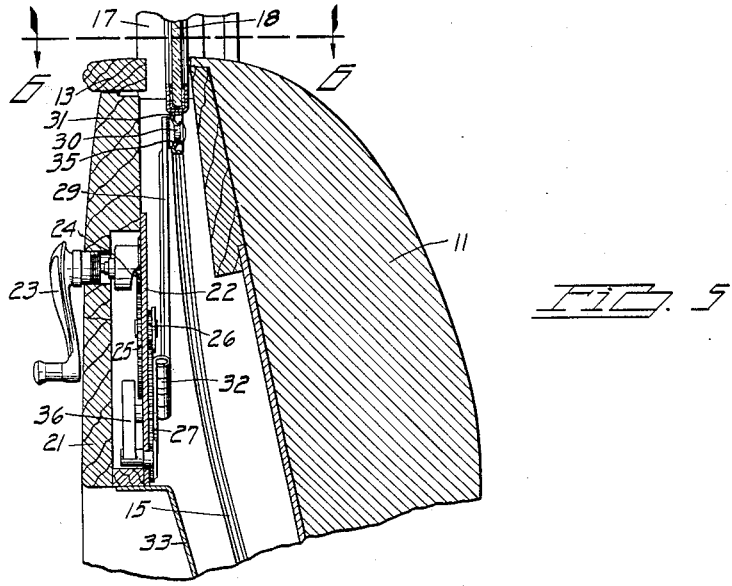
Figure 5 shows a vertical central sectional view through the regulator, shown in Figure 1.

Referring to the accompanying drawings, I have used the reference numeral 10 to indicate an automobile body of the closed car type in which a front seat 11 is provided extending thereacross and a rear seat 12 likewise extending across the body. The back cushion of the front seat 11 has its upper portion tipped rearwardly in the conventional manner, the top edge thereof being substantially in line with a pair of door pillars 14, one on each side of the car, which pillars extend from the roof down to the sill of the body.

Figure 6:
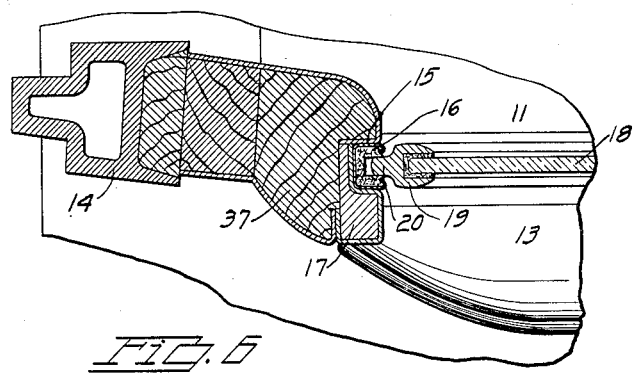
Figure 6 shows a sectional view, taken on the line 6—6 of Figure 5.

Securely fastened to the inside of each pillar 14 I have provided a partition post 37 to thereby form a support for my glass partition. The inner side of each of these posts are provided with runways, consisting of channel-shaped members 15 each having a felt liner 16 secured therein. These channels may be inserted directly in a suitable groove in the posts or, if desired, these posts may be recessed, as shown in Figure 6, to receive a strip 17 in which an arcuate groove is machined. In this case the groove receives the channel 15 so that when the strips are secured to the posts the channels 15 will be secured in the desired position.

Figure 7:
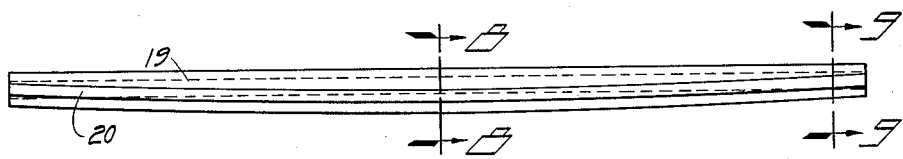
Figure 7 shows a view of the edge of my glass partition frame, illustrating the arcuate guides therein.
Figure 8:
Figure 8 shows a sectional view taken on the line 8—8 of Figure 7.
Figure 9:
Figure 9 shows a sectional view taken on the line 9—9 of Figure 7.

The partition used herewith consists of a rectangular sheet of glass 18 having a frame 19 secured therearound. This sheet of glass and frame member are flat so that to guide the frame member in the arcuate channels 15 the sides of this frame are each provided with a tongue 20 projecting outwardly therefrom which runs the length of the side. As will be noted from Figures 7, 8 and 9, these tongues are curved to correspond to the channels 15 so that the frame may freely oscillate up and down in the channels 15.

In order to raise or lower the partition I have provided a window regulator of the oscillating arm type which coacts with the bottom of my frame member 19 so that the frame may be manually raised or lowered. The regulator is mounted upon a board 21 which extends across the body of the car just beneath the top edge of the front seat back, the upper edge of this board being finished off with a garnish strip 13.

My regulator consists of a flat plate 22 which is fastened to the inside of the board 21 and a crank 23 is rotatably mounted in the board 21 in driving connection with a pinion gear 24 which is in mesh with a larger gear 25. The gear 25 is rotatably mounted in the center portion of the plate 22 and is in driving connection with a second pinion 26, this latter pinion being in mesh with a gear 27 which is rotatably mounted in one lower corner of the plate 22. A gear 28, similar in size to the gear 27, is in mesh therewith and is rotatably mounted in the opposite lower corner of the plate. Thus, when the crank 23 is rotated the gears 27 and 28 are likewise rotated but at a reduced speed.

Secured thereto and extending radially from the axes of the gears 27 and 28 and in the plane of the plate 32, I have provided a pair of regulating arms 29, the outer ends of which are provided with rollers 30 which operate against the lower edge of the partition. A pair of brackets 31, having longitudinal slots 35 therein, are secured to this lower edge in position so that the rollers operate in these slots. A pair of helical springs 36 are mounted around the axes of the gears 27 and 28 thereby urging the arms 28 to their upper positions. Inasmuch as the arms 29 would normally swing in a flat plane, I have provided a hinge 32 in each of the arms 29 so that the outer ends thereof may also swing in a plane transversely to the plane of oscillation. Thus, when the arms are oscillated the outer ends thereof are free to move forwardly or rearwardly to compensate for the arcuate path described by the brackets 31.

The lower edge of the partition drops beneath the bottom of the board 21 and in order that this portion may not be visible beneath the board 21 when the partition is lowered, I have provided a shield 33 which extends from the bottom of the board down to the back of the front seat leaving a chamber between the seat and the plate so that the arcuate movement of the partition is not obstructed. For this reason an auxiliary seat 34 may be secured in the body and still ample foot room will be provided for the occupants of the auxiliary seat.

Among the many advantages arising from the use of my improved structure it may be well to mention that I have provided an automobile body which, while essentially adapted for chauffeur operation, may be readily converted into a sedan type body by lowering a glass partition therein.

Still further, my partition being lowered in an arcuate path provides increased foot room for the occupants in the rear thereof, which foot room would not otherwise be available if a straight vertically reciprocating partition were to be used.

Still a further advantage results from the use of my improved type regulating mechanism in that the arms thereof, while operating primarily in a vertical plane, are still free to swing transversely across this plane to thereby compensate for the arcuate movement of my partition.

Some changes may be made in the arrangement, construction and combination of the various parts of my improved device without departing from the spirit of my invention, and it is my intention to cover by my claims, such changes as may reasonably be included within the scope thereof.

I claim as my invention:

1. A window regulator especially adapted to reciprocate one end of a slidable partition along a curved path comprising, an arm pivotally mounted so as to swing in a path substantially in the plane of said partition, the free end of said arm being connected to one edge of the partition to actuate same, means for oscillating said arm, and a hinge disposed in said arm permitting the outer end thereof to swing in a path transverse to its plane of oscillation whereby the outer end thereof may follow the irregular path traveled by said partition.

2. A regulator especially adapted to raise and lower a movable partition along an irregular path comprising, an arm pivotally mounted so as to swing in a path substantially in the plane of said partition, the free end of said arm being adapted to bear directly against the lower edge of said partition, means for oscillating said arm, and a hinge disposed in said arm permitting the free end thereof to swing in a path transverse to its plane of oscillation, whereby said free end may follow the irregular path traveled by said partition.

3. A regulator especially adapted to raise and lower a movable partition along a curved path comprising, a pair of laterally spaced arms pivotally mounted so as to swing in paths each of which is substantially in the plane of said partition, the free end of each arm being slidably connected to the lower edge of said partition to actuate same, means for simultaneously oscillating said arms in opposite directions so that their free ends remain in substantial horizontal alignment and thus maintain the lower edge of said partition in a level position while being raised and lowered, and a hinge disposed in each of said arms permitting the free ends thereof to swing in paths transverse to their planes of oscillation, whereby said free ends may follow the curved path traveled by said partition.

4. A regulator especially adapted for raising and lowering a movable partition along a curved path comprising, a pair of laterally spaced arms pivotally mounted so as to swing in paths each of which is substantially in the plane of said partition, the free ends of said arms being adapted to bear against the lower edge of said partition, a crank adapted to simultaneously oscillate said arms in opposite directions so that their free ends raise and lower in substantially horizontal alignment and thus maintain the lower edge of said partition in a level position, and a hinge disposed in each of said arms permitting the free ends thereof to swing in paths transverse to their planes of oscillation, whereby said free ends may follow the curved path of said partition.

5. A window regulator especially adapted to raise and lower a movable partition along a curved path comprising, a pair of laterally spaced arms pivotally mounted and geared together so as to oscillate in opposite directions in paths substantially in the plane of said partition, the free end of each of said arms being connected to the lower edge of said window to raise and lower same, a crank adapted to manually oscillate said arms through said gearing, and a hinge disposed in each of said arms permitting the free ends thereof to swing in paths transverse to their planes of oscillation, whereby said free ends may follow the irregular path of said partition.

6. A device especially adapted to reciprocate one edge of a movable partition along a curved path comprising, an arm pivotally mounted so as to oscillate in a plane substantially aligned with the curved path traveled by said edge, means for oscillating said arm, and a hinge associated with said device permitting the free end of said arm to swing in a path transverse to its plane of oscillation, whereby said free end may follow the curved path traveled by said edge of said partition.

7. A device, as claimed in claim 6, wherein said partition comprises one of the transparent windows of a motor vehicle, and wherein the means for oscillating said arm is actuated by a crank exposed in the passenger compartment of the vehicle.

8. A device, as claimed in claim 6, wherein said hinge is located between the free end of said arm and said oscillating means whereby said oscillating means may be secured in a relatively fixed position.

9. A device, as claimed in claim 6, wherein the free end of said arm is connected to the lower edge of said partition so as to directly reciprocate same.

10. A device, as claimed in claim 6, wherein the free end of said arm is slidably connected to and directly bears against the said partition edge to directly reciprocate said partition.

11. A device especially adapted to reciprocate one edge of a movable partition along a curved path comprising, a pair of laterally spaced arms pivotally mounted so as to oscillate in paths each of which is substantially aligned with the curved path traveled by said edge, means for simultaneously oscillating said arms, and a hinge connection associated with said device permitting the free ends of said arms to swing in paths transverse to their planes of oscillation, whereby said free ends may follow the curved path traveled by said edge of said partition.

12. A device, as claimed in claim 11, wherein said partition comprises one of the transparent windows of a motor vehicle and wherein the means for oscillating said arms is actuated by a crank exposed in the passenger compartment of the vehicle.

13. A device, as claimed in claim 11, wherein said arms are simultaneously oscillated in opposite directions.

14. A device, as claimed in claim 11, wherein the free ends of said arms are slidably connected to said partition to actuate same.

15. A device, as claimed in claim 11, wherein said arms are simultaneously oscillated in opposite directions and wherein the free ends thereof bear directly against the lower edge of said partition to insure that all positions of said edge will be parallel with each other.

16. A window regulator especially adapted to move the lower edge of a vehicle window along a curved path comprising, a pair of laterally spaced arms pivotally mounted and geared together so as to simultaneously oscillate in opposite directions in paths substantially following the curved path of said edge, the free end of each arm being connected to the lower edge of said window, a crank adapted to be manually rotated by the occupants of the vehicle, said crank being operatively connected to said gearing, and a hinge mounting for said arms permitting the free ends thereof to swing in paths transverse to their planes of oscillation, whereby said free ends may swing to follow the curved path traveled by the lower edge of said window.

LAWRENCE B. RIVARD.